United States Patent
Simonson (10) Patent No.: US 10,474,582 B2
(45) Date of Patent: Nov. 12, 2019

(54) NAND FLASH STORAGE DEVICE AND METHODS USING NON-NAND STORAGE CACHE

(71) Applicant: Seagate Technology LLC, Cupertino, CA (US)

(72) Inventor: Dana L. Simonson, Owatonna, MN (US)

(73) Assignee: Seagate Technology LLC, Cupertino, CA (US)

(*) Notice: Subject to any disclaimer, the term of this patent is extended or adjusted under 35 U.S.C. 154(b) by 134 days.

(21) Appl. No.: 15/581,215

(22) Filed: Apr. 28, 2017

(65) Prior Publication Data

US 2018/0314434 A1    Nov. 1, 2018

(51) Int. Cl.
*G06F 12/0875*    (2016.01)
*G06F 12/02*    (2006.01)
*G06F 12/0866*    (2016.01)

(52) U.S. Cl.
CPC ...... *G06F 12/0875* (2013.01); *G06F 12/0246* (2013.01); *G06F 12/0866* (2013.01);
(Continued)

(58) Field of Classification Search
CPC .... G06F 3/0608; G06F 3/0655; G06F 3/0679; G06F 3/0641; G06F 12/0253;
(Continued)

(56) References Cited

U.S. PATENT DOCUMENTS

| 5,636,355 A * | 6/1997 | Ramakrishnan .... G06F 12/0804 711/113 |
| 6,026,027 A * | 2/2000 | Terrell, II ........... G06F 12/0246 365/185.33 |

(Continued)

OTHER PUBLICATIONS

Hong et al., "NAND Flash-Based Disk Cache Using SLC/MLC Combined Flash Memory," 2010 International Workshop on Storage Network Architecture and Parellel I/Os, IEEE Computer Society, pp. 21-30 (May 2010).

(Continued)

*Primary Examiner* — Mano Padmanabhan
*Assistant Examiner* — William E. Baughman
(74) *Attorney, Agent, or Firm* — Ryan, Mason & Lewis, LLP (57) ABSTRACT

NAND flash storage devices and methods are provided that use a non-NAND cache to store write data until a substantially complete storage unit is available. An exemplary solid state storage device comprises a NAND flash memory device; a non-NAND cache; and a controller configured to obtain write data from a remote host for storage in the NAND flash memory device; store the write data in the non-NAND cache; and transfer the write data from the non-NAND cache to the NAND flash memory device when a predefined storage criterion is satisfied. The predefined storage criterion comprises, for example, a storage unit of the write data stored in the non-NAND cache, where the storage unit comprises a block of data erased in a single garbage collection cycle. The predefined storage criterion is (Continued)

optionally established to reduce open block degradation in NAND flash memory devices.

20 Claims, 4 Drawing Sheets

(52) U.S. Cl.
CPC .. *G06F 2212/214* (2013.01); *G06F 2212/221* (2013.01); *G06F 2212/313* (2013.01); *G06F 2212/7204* (2013.01); *G06F 2212/7205* (2013.01)

(58) Field of Classification Search
CPC ......... G06F 12/0875; G06F 2212/7204; G06F 2212/7205
See application file for complete search history.

(56) References Cited

U.S. PATENT DOCUMENTS

| | | | |
|---|---|---|---|
| 9,367,396 B2 | 6/2016 | Bonwick | |
| 2005/0251617 A1* | 11/2005 | Sinclair | G06F 3/061 711/103 |
| 2006/0143407 A1* | 6/2006 | Humlicek | G06F 12/0804 711/143 |
| 2009/0132770 A1* | 5/2009 | Lin | G06F 12/0804 711/154 |
| 2012/0124294 A1* | 5/2012 | Atkisson | G06F 11/108 711/135 |
| 2013/0016559 A1 | 1/2013 | Song et al. | |
| 2014/0365719 A1 | 12/2014 | Kuzmin et al. | |
| 2016/0092116 A1* | 3/2016 | Liu | G11C 5/025 711/103 |
| 2016/0117253 A1* | 4/2016 | Sprouse | G06F 12/0868 711/103 |

OTHER PUBLICATIONS

Geoff Gasior, "Micron's M600 SSD Accelerates Writes With Dynamic SLC Cache," Tech Report (Sep. 2016).
Andreasson, Eva, "How-To JVM Performance Optimization, Part 3: Garbage Collection; Choose the Right Garbage Collector for Your Application Needs," JavaWorld (Oct. 10, 2012).
Hutchinson, Lee, "Solid-State Revolution: In-Depth on How SSDs Really Work," https://arstechnica.com/information-technology/2012/06/inside-the-ssd-revolution-how-solid-state-disks-really-work/4/ (Jun. 4, 2012).
"Understanding Flash: Garbage Collection Matters," Flashdba, Oracle Databases, Storage and the High-Performance World of Flash Memory, https://flashdba.com/2014/10/15/understanding-flash-garbage-collection-matters/ (Oct. 15, 2014).

* cited by examiner

NAND FLASH STORAGE DEVICE AND METHODS USING NON-NAND STORAGE CACHE

FIELD

The field relates generally to solid state storage devices and, more particularly, to caching techniques for storing write data in such solid state storage media.

BACKGROUND

Data in solid state storage devices, such as NAND (Not AND) storage devices, may decay over time when kept in an open state. Solid state storage devices typically write data to the storage medium as a storage unit (e.g., the amount of data that is erased in a single garbage collection cycle). In the case of sparsely and/or sporadically written user data, a storage unit may be opened by the controller and some data may be written to the storage unit, but the user may not provide enough data to fill the storage unit. In this case, all of the blocks in the storage unit must be kept in an open state until more data is received to fill the storage unit. A known limitation of NAND devices is that open blocks of data will degrade over time. If not monitored and the block closed or rewritten before the degradation becomes critical, the data written to open blocks could be lost. For this reason, NAND storage devices typically track open blocks and refresh them, as needed, to prevent data loss. This protects the data, but results in an extra Program/Erase cycle for the open block(s) and reduces the effective endurance of the solid state storage device.

A need therefore exists for improved techniques for reducing open block degradation in NAND flash memory devices.

SUMMARY

Illustrative embodiments of the present disclosure provide methods, storage devices and apparatus for reducing open block degradation in NAND flash memory devices using a non-NAND cache to store write data until a substantially complete storage unit is available. In one embodiment, a solid state storage device comprises a NAND flash memory device; a non-NAND cache; and a controller configured to obtain write data from a remote host for storage in the NAND flash memory device; store the write data in the non-NAND cache; and transfer the write data from the non-NAND cache to the NAND flash memory device when a predefined storage criterion is satisfied.

In one or more embodiments, the NAND flash memory device comprises a plurality of die and the predefined storage criterion comprises a storage unit of the write data stored in the non-NAND cache, wherein the storage unit comprises a block of data on each of the plurality of die erased in a single garbage collection cycle. For example, the transfer is optionally triggered when the non-NAND cache comprises enough write data to substantially fill a predefined number of blocks in the NAND flash memory device (e.g., a number of blocks erased in a single garbage collection cycle).

In some embodiments, the predefined storage criterion is established to reduce open block degradation in NAND flash memory devices.

These and other illustrative embodiments disclosed herein include, without limitation, methods, apparatus, controllers, solid state storage devices and computer program products comprising processor-readable storage media.

DETAILED DESCRIPTION

Illustrative embodiments will be described herein with reference to exemplary solid state storage devices and associated storage media, controllers, and other processing devices. It is to be appreciated, however, that these and other embodiments are not restricted to the particular illustrative system and device configurations shown. Accordingly, the term "solid state storage device" as used herein is intended to be broadly construed, so as to encompass, for example, any storage device comprising a NAND storage medium. Numerous other types of storage systems are also encompassed by the term "solid state storage device" as that term is broadly used herein.

In one or more embodiments, methods and apparatus are provided for reducing open block degradation in NAND flash memory devices using a non-NAND cache to store write data until a substantially complete storage unit is available.

Figure 1:
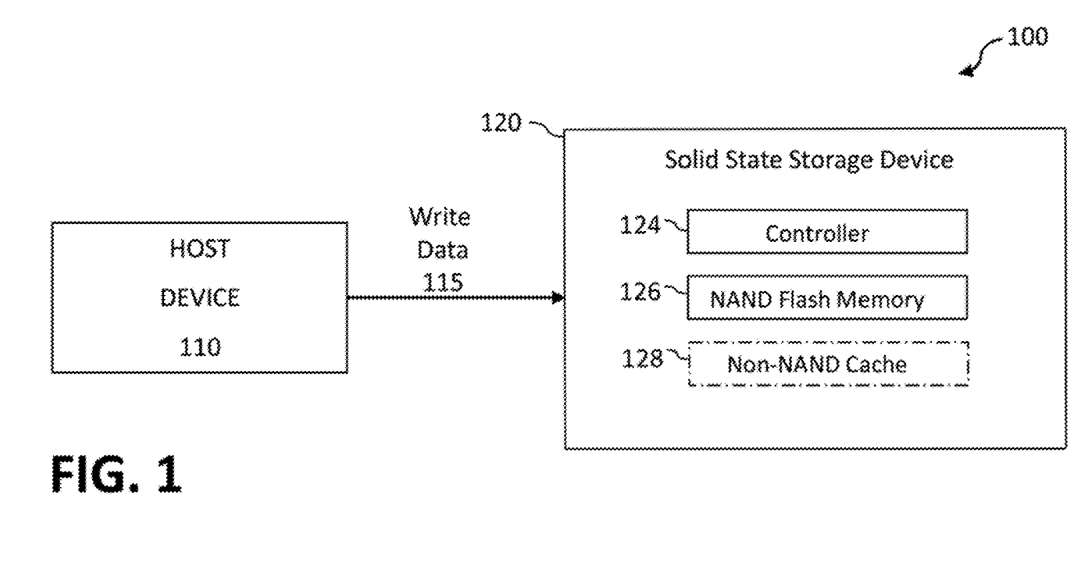
FIG. 1 illustrates a solid state storage device including a non-NAND cache for storing write data, in accordance with one or more embodiments of the present disclosure.

FIG. 1 illustrates a solid state storage device 120 that receives write data 115 from a host device 110. As noted above, solid state storage devices 120 typically write data to the storage medium as a storage unit (e.g., the amount of data that is erased in a single garbage collection cycle). In the case of sparsely and/or sporadically written user data, a storage unit may be opened by the controller and some data may be written to the storage unit, but the user may not provide enough data to fill the storage unit.

The solid state storage device 120 may provide capabilities usually associated with data storage devices, e.g., storing and retrieving blocks of data. Generally, the host device 110 directs read and write access to the solid state storage device 120. As shown in FIG. 1, the example solid state storage device 120 comprises a controller 124; one or more NAND flash memory devices 126 and a non-NAND cache 128. The non-NAND cache 128 is shown in FIG. 1 with a dashed line to indicate that the non-NAND cache 128 need not be implemented as a distinct device, in the manner shown in FIG. 1, as discussed further below.

One or more embodiments of the disclosure reduce the open degradation problem that is commonly found in conventional solid state storage devices by storing the write data 115 in the non-NAND cache 128 until a substantially complete storage unit is available.

The interface between the host 110 and solid state storage device 120 may be configured for parallel operations for data storage.

In various embodiments, the non-NAND cache may be implemented, for example, as a non-volatile memory or power loss protected random access memory (RAM), such as dynamic RAM (DRAM), resistive RAM (RRAM), phase-change memory (PCM), or a nano-RAM (NRAM).

An example process for performing a write operation using the non-NAND cache 128 is discussed further below in conjunction with FIG. 4. Conventional techniques may be employed for writing the write data 115 to a particular address of the NAND flash memory 126, as well as any necessary formatting and/or encoding of the write data 115.

Generally, the solid state storage device 120 includes a host interface (not shown) configured to communicate with the host device 110. The host interface may use electrical specifications and protocols associated with existing solid state storage devices, such as SATA (Serial ATA), SaS, SCSI, USB, PCI, etc., and/or network interfaces such as Ethernet.

The controller 124 includes hardware to perform the storage functionality of the solid state storage device, such as read, write, and verify operations on data that is stored on the storage media and to otherwise manage the NAND flash memory 126. For example, the controller 124 may include one or more processing units, firmware, general-purpose logic circuitry and/or special-purpose logic circuitry (e.g., hardware acceleration blocks that control and move the data) configured to perform the storage functions, in a known manner, as modified herein to provide the features and functions of the present disclosure. In one or more embodiments, the controller 124 may be implemented using various technologies, such as a microprocessor, a microcontroller, an application-specific integrated circuit (ASIC), a field-programmable gate array (FPGA) or other type of processing circuitry, as well as portions or combinations of such circuitry elements.

It is to be appreciated that this particular arrangement of modules 124, 126, and 128 illustrated in the solid state storage device 120 of the FIG. 1 embodiment is presented by way of example only, and alternative arrangements can be used in other embodiments. For example, the functionality associated with the modules 124, 126, and 128 in other embodiments can be combined into a single module, or separated across a larger number of modules. Thus, in one or more embodiments, the ASIC controller 124 can further comprise the non-NAND cache 128 (e.g., DRAM). In other embodiments, the non-NAND cache 128 is a distinct device relative to the ASIC controller 124.

In this manner, the controller 124, the NAND flash memory device(s) 126 and/or the non-NAND cache 128 of the solid state storage device 120 are implemented on a same chip, or on different chips.

At least portions of the controller 124 may be implemented at least in part in the form of software that is stored in a memory and executed by a processor, as discussed further below in conjunction with FIG. 4. It should also be understood that the particular set of elements shown in FIG. 1 for reducing open block degradation in NAND flash memory devices using a non-NAND cache to store write data until a substantially complete storage unit is available is presented by way of illustrative example only, and in other embodiments additional or alternative elements may be used. Thus, another embodiment may include additional or alternative systems, devices and components, as well as different arrangements of modules and other components.

Figure 2:
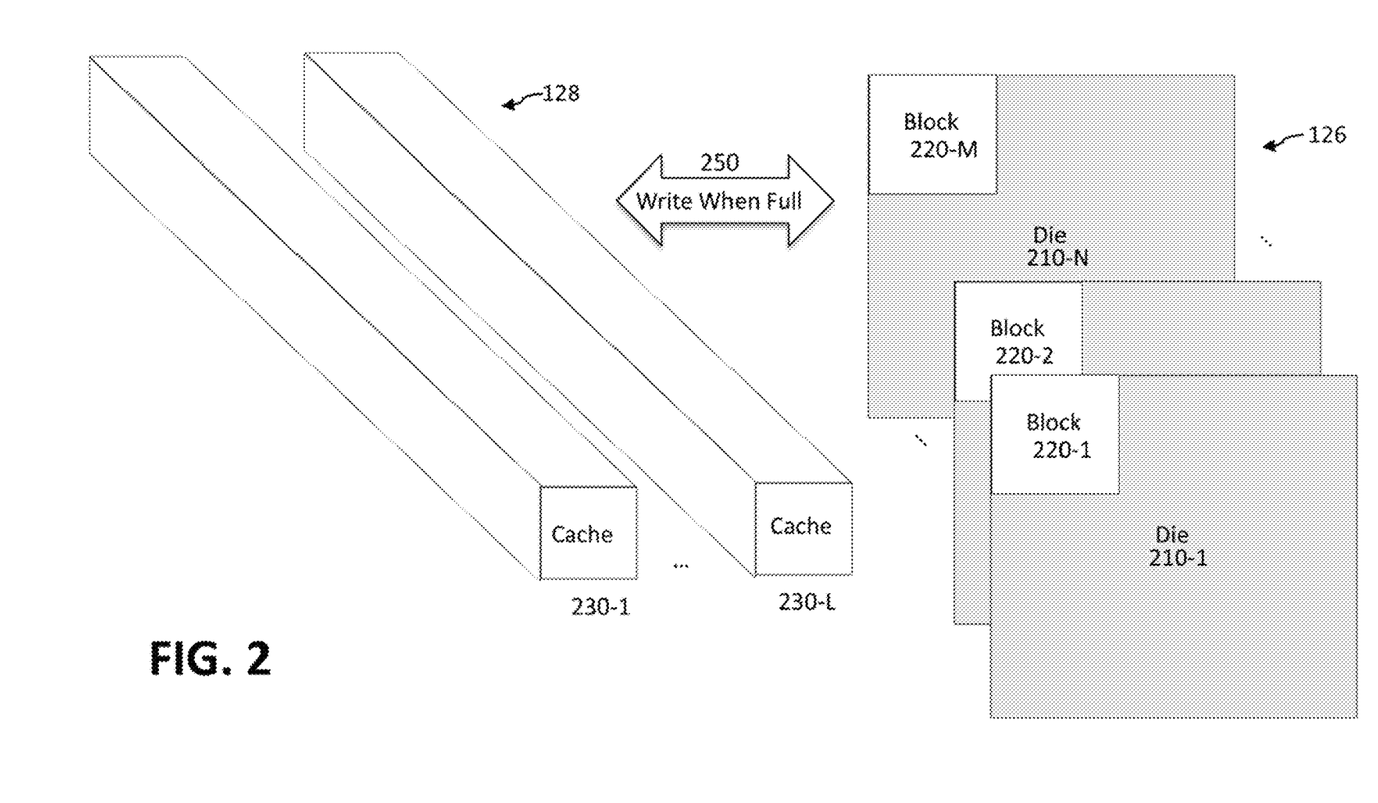
FIG. 2 illustrates the storage of write data in the non-NAND cache of FIG. 1 until a substantially complete storage unit is available, according to one embodiment of the disclosure.

FIG. 2 illustrates the storage of write data in the non-NAND cache 128 of FIG. 1 until a substantially complete storage unit is available, according to one embodiment of the disclosure. As discussed further below in conjunction with FIG. 3, as write data is received by the solid state storage device 120 for storage in the NAND flash memory 126, the write data is written in the non-NAND cache 128 until a predefined storage criterion is satisfied. The predefined storage criterion in FIG. 2 is expressed as "write when full" 250.

As shown in FIG. 2, the exemplary non-NAND cache 128 comprises a plurality of cache lines 230-1 through 230-L, each capable of storing a complete storage unit. In addition, the exemplary non-NAND cache 128 comprises a plurality die 210-1 through 210-N each having a plurality of blocks 220. In a typical storage arrangement, the data from a given storage unit is stored in a plurality of blocks 220-1 through 220-M spread across a plurality of the die 210. In other words, a storage unit of data comprises a block of data 220 on N die 210. The number of blocks (M) that store a given storage unit may be less than the number (N) of die available on the NAND flash memory device 126.

As noted above, when writing data to the NAND flash memory 126, a solid state storage device 120 will typically organize the write data into storage units for efficient management of the NAND erase cycles. These storage units may typically contain a block 220 from a plurality (N) of die 210 contained within the NAND flash memory 126. The size of the blocks 220 and the number (M) of blocks within the NAND flash memory 126 could result in this storage unit being a large amount of data. Since blocks 220 have a limited number of program-erase cycles, it is important to minimize the number of times that a block is erased. A corollary to this requirement is therefore that the block 220 be substantially completely filled with data since closing a block with unused capacity would result in more erase cycles.

In some usage environments, the user may sparsely and or sporadically write to the NAND flash memory 126. A storage unit may be opened and data written to it, but the user may not provide enough data to fill the unit. In this case, all of the blocks 220 in the unit must be kept in an open state until more write data is received. A known limitation of conventional NAND devices is that open blocks will degrade over time. If not monitored and the block closed or rewritten before the degradation gets too bad, the data written to that block could be lost. For this reason, conventional NAND storage devices track the open blocks and refresh them as needed. This protects the data, but reduces the effective endurance of the drive.

To alleviate these issues, one or more embodiments of the present disclosure reduce this open block degradation in the NAND flash memory devices 126 using the non-NAND cache 128 to store the write data until a substantially complete storage unit is available.

Sufficient cache is provided in the non-NAND cache 128 to hold the number of open storage units that the NAND flash memory device 126 fills simultaneously plus enough additional units to handle the data that arrives as the unit is being written to the NAND flash memory devices 126. In this way, the NAND flash memory devices 126 can continuously fill data into the non-NAND cache 128 and the NAND flash memory devices 126 will only have open blocks for the period of time that it takes to writes a block 220 of data into the die 210. As soon as the die 210 is written, the corresponding portion of the write data from the storage unit is marked as written and that block is closed. Once the entire storage unit has been written out, the non-NAND cache memory 128 for that storage unit can be returned to the free pool and made available to replace the next storage unit that fills and needs to be written to flash.

The user may read back data that is within the non-NAND cache 128 prior to it being written to the NAND flash memory devices 126. The location of the data whether in non-NAND cache 128 or a NAND flash memory device 126 must be tracked by the indirection methods of the solid state storage device 120. Algorithms for optimizing the tracking of the location of data as it is stored in the cache and pushed out to the NAND flash memory devices 126 are well known in the art and are beyond the scope of the present disclosure. Any such algorithm can be used in conjunction with the present disclosure, as would be apparent to a person of ordinary skill in the art.

Figure 3:
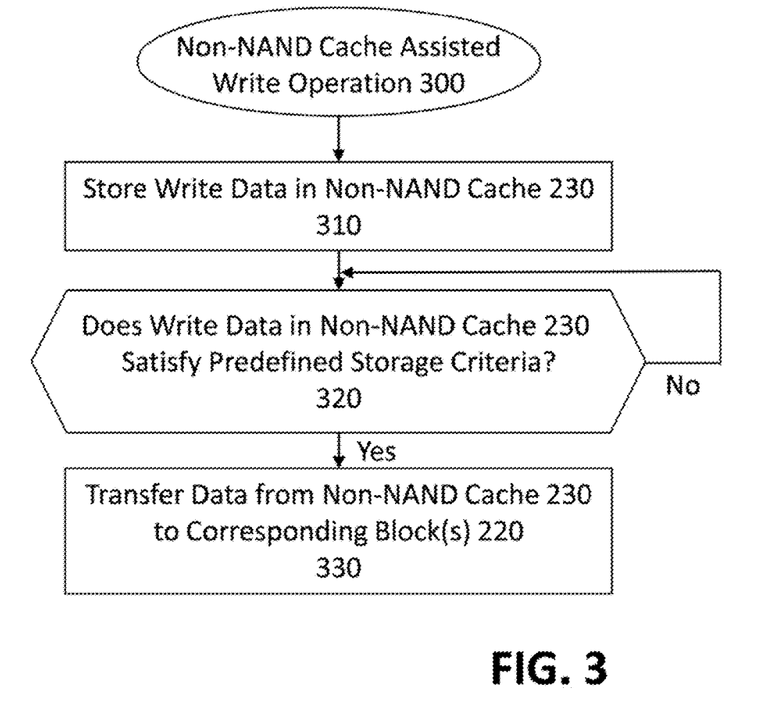
FIG. 3 is a flow chart illustrating an implementation of a non-NAND cache assisted write operation, according to one embodiment of the disclosure.

An exemplary process utilizing a non-NAND cache to store write data until a substantially complete storage unit is available will now be described in more detail with reference to the flow diagram of FIG. 3. FIG. 3 is a flow chart illustrating an implementation of a non-NAND cache assisted write operation 300, according to one embodiment of the disclosure. It is to be understood that this particular operation implementation is only an example, and additional or alternative operations can be carried out in other embodiments.

In the embodiment of FIG. 3, the process includes steps 310, 320 and 330. These steps are assumed to be performed by the solid state storage device 120 using its controller 124, but in other embodiments these steps can be performed using other types of components and associated processing and/or control devices.

In step 310, the write data for a given storage unit is stored in the non-NAND cache 230 associated with a corresponding block 220. A test is performed during step 320 to determine if the write data in non-NAND cache 230 satisfies a predefined storage criterion. For example, the predefined storage criterion may comprise a storage unit of the write data stored in the non-NAND cache 230, wherein the storage unit comprises a block of data on each of the plurality of die erased in a single garbage collection cycle.

If it is determined during step 320 that the write data in non-NAND cache 230 does not satisfy the predefined storage criterion, then program control returns to step 320 and waits. If, however, it is determined during step 320 that the write data in non-NAND cache 230 does satisfy the predefined storage criteria, then the data is transferred from the non-NAND cache 230 to the corresponding block(s) 220 of the NAND flash memory 126 during step 330.

Figure 4:
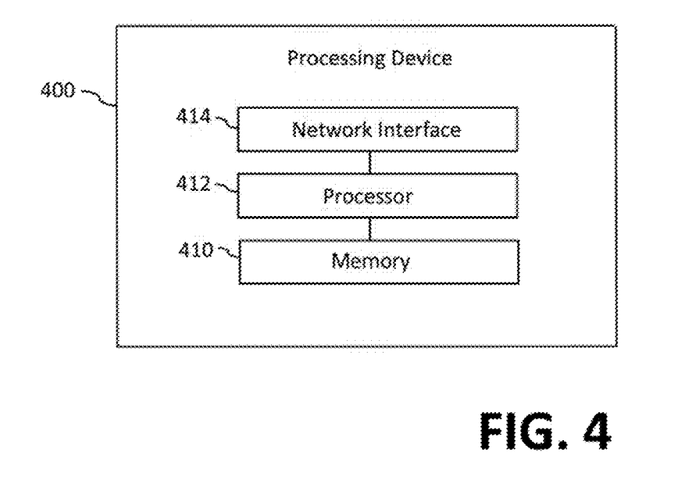
FIG. 4 illustrates an example processing device that may be utilized to implement at least a portion of a solid state storage device in illustrative embodiments of the present disclosure.

FIG. 4 illustrates an example processing device 400 that may be utilized to implement at least a portion of a solid state storage device in illustrative embodiments of the present disclosure. As shown in FIG. 4, the example processing device 400 comprises a memory 410, a processor 412 and a network interface 414.

The processor 412 illustratively comprises a microprocessor, a microcontroller, an application-specific integrated circuit (ASIC), a field-programmable gate array (FPGA) or other type of processing circuitry, as well as portions or combinations of such circuitry elements.

The memory 410 illustratively comprises random access memory (RAM), read-only memory (ROM) or other types of memory, in any combination. The memory 410 and other memories disclosed herein may be viewed as examples of what are more generally referred to as "processor-readable storage media" storing executable computer program code or other types of software programs.

Articles of manufacture comprising such processor-readable storage media are considered embodiments of the present disclosure. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 414 allows the solid state storage device 120 to communicate over at least one network with other devices, and illustratively comprises one or more conventional transceivers. Another illustrative embodiment of a processing platform that may be used to implement at least a portion of an information processing system comprises a plurality of processing devices which communicate with one another over the at least one network.

CONCLUSION

The foregoing applications and associated embodiments should be considered as illustrative only, and numerous other embodiments can be configured using the open block degradation reduction techniques disclosed herein. According to one or more embodiments, the methods and processes described herein may be implemented in a controller as software, hardware, or any combination of the two.

It should be understood that the particular system configurations illustrated in FIGS. 1 through 4 are presented by way of illustrative example only, and should not be construed as limiting in any way. Numerous alternative configurations of solid state storage devices, controllers and other system elements can be used in other embodiments.

Illustrative embodiments of the open block degradation reduction techniques disclosed herein can provide a number of significant advantages relative to conventional arrangements. For example, in some embodiments disclosed herein, open block degradation is significantly reduced by storing write data in a non-NAND cache until a substantially complete storage unit is available. These and other embodiments advantageously provide solid state storage device with substantially improved endurance than would otherwise be possible.

The methods and processes described herein may be stored in a memory as part of the firmware of a solid state storage device and may be executed by a processor for performing the methods and processes described herein. The methods and processes described herein may alternatively or additionally be stored in other computer-readable media accessible by the controller. In further embodiments, the methods and processes described herein may be implemented in a computing system external to and operably connected to the storage device, such as in a driver module of a host device connected to storage device through an interface, for example. The methods and processes described herein may further be stored in a memory or other computer-readable media accessible by the computing system and be executed by a processor of the computing system.

It should also be understood that the open block degradation reduction techniques, as described herein, can be implemented at least in part in the form of one or more software programs stored in memory and executed by a processor of a processing device such as a computer. A memory or other storage device having such program code embodied therein is an example of what is more generally referred to herein as a "computer program product."

The disclosed open block degradation reduction techniques may be implemented using one or more processing platforms, such as the processing platform shown in FIG. 4.

One or more of the processing modules or other components may therefore each run on a computer, storage device or other processing platform element. A given such element may be viewed as an example of what is more generally referred to herein as a "processing device."

Again, the particular processing platform 400 shown in FIG. 4 is presented by way of example only, and the given system may include additional or alternative processing platforms, as well as numerous distinct processing platforms in any combination, with each such platform comprising one or more computers, storage devices or other processing devices.

As is known in the art, the methods and apparatus discussed herein may be distributed as an article of manufacture that itself comprises a processor-readable storage media having processor readable code means embodied thereon. Articles of manufacture comprising such processor-readable storage media are considered examples of illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of NAND flash memories, non-NAND caches, controllers or other components are possible in a solid state storage device as disclosed herein. Such components can communicate with other elements of the solid state storage device over any type of bus, network or other communication media.

It should again be emphasized that the above-described embodiments are presented for purposes of illustration only. Many variations and other alternative embodiments may be used. For example, the disclosed techniques are applicable to a wide variety of other types of solid state storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A solid state storage device, comprising:
   a NAND flash memory device;
   a non-NAND cache; and
   a controller configured to obtain write data from a remote host for storage in the NAND flash memory device; store the write data in the non-NAND cache; and transfer the write data from the non-NAND cache to the NAND flash memory device when a predefined storage criterion is satisfied, wherein the NAND flash memory device comprises a plurality of die and wherein the predefined storage criterion comprises a storage unit of the write data stored in the non-NAND cache, wherein the storage unit comprises a block of data on each of the plurality of die, and wherein the block of data on each of the plurality of die is erased in a single garbage collection cycle.

2. The solid state storage device of claim 1, wherein the predefined storage criterion is established to reduce an open block degradation in the NAND flash memory device.

3. The solid state storage device of claim 1, wherein the transfer is triggered when the non-NAND cache comprises a substantially complete storage unit.

4. The solid state storage device of claim 3, wherein the predefined number of blocks in the NAND flash memory device comprises a number of blocks erased in the single garbage collection cycle.

5. The solid state storage device of claim 4, wherein the non-NAND cache has a capacity to store the predefined number of blocks plus additional write data that arrives during the transfer.

6. The solid state storage device of claim 1, wherein the controller is further configured to mark corresponding portions of the write data as written and close corresponding blocks of the NAND flash memory device.

7. The solid state storage device of claim 1, wherein the controller is further configured to return corresponding portions of the non-NAND cache to a free pool as the write data is transferred from the non-NAND cache to the NAND flash memory device.

8. The solid state storage device of claim 1, wherein the controller is further configured to obtain requested data from one or more of the non-NAND cache and the NAND flash memory device using an indirection method in response to a read request.

9. The solid state storage device of claim 1, wherein the controller comprises one or more of a processor, firmware and a dedicated hardware circuit.

10. The solid state storage device of claim 1, wherein one or more of the controller, the non-NAND cache and the NAND flash memory device are on one or more of a same chip and different chips.

11. A method, comprising:
    obtaining write data from a remote host for storage in a NAND flash memory device of a solid state storage device;
    storing the write data in a non-NAND cache of the solid state storage device; and
    transferring the write data from the non-NAND cache to the NAND flash memory device when a predefined storage criterion is satisfied, wherein the NAND flash memory device comprises a plurality of die and wherein the predefined storage criterion comprises a storage unit of the write data stored in the non-NAND cache, wherein the storage unit comprises a block of data on each of the plurality of die, and wherein the block of data on each of the plurality of die is erased in a single garbage collection cycle.

12. The method of claim 11, wherein the predefined storage criterion is established to reduce an open block degradation in the NAND flash memory device.

13. The method of claim 11, wherein the transferring is triggered when the non-NAND cache comprises a substantially complete storage unit.

14. The method of claim 11, further comprising the step of obtaining requested data from one or more of the non-NAND cache and the NAND flash memory device using an indirection method in response to a read request.

15. A computer program product, comprising a non-transitory processor-readable storage medium having stored therein program code of one or more software programs, wherein the program code when executed by at least one processing platform causes the at least one processing platform to implement the following steps:

obtaining write data from a remote host for storage in a NAND flash memory device of a solid state storage device;

storing the write data in a non-NAND cache of the solid state storage device; and transferring the write data from the non-NAND cache to the NAND flash memory device when a predefined storage criterion is satisfied, wherein the NAND flash memory device comprises a plurality of die and wherein the predefined storage criterion comprises a storage unit of the write data stored in the non-NAND cache, wherein the storage unit comprises a block of data on each of the plurality of die, and wherein the block of data on each of the plurality of die is erased in a single garbage collection cycle.

16. The computer program product of claim 15, wherein the predefined storage criterion is established to reduce an open block degradation in the NAND flash memory device.

17. The computer program product of claim 15, wherein the transferring is triggered when the non-NAND cache comprises a substantially complete storage unit.

18. The method of claim 13, wherein the predefined number of blocks in the NAND flash memory device comprises a number of blocks erased in the single garbage collection cycle.

19. The method of claim 18, wherein the non-NAND cache has a capacity to store the predefined number of blocks plus additional write data that arrives during the transfer.

20. The computer program product of claim 17, wherein the predefined number of blocks in the NAND flash memory device comprises a number of blocks erased in the single garbage collection cycle.

* * * * *